United States Patent [19]

Brouwer et al.

[11] 4,396,341

[45] Aug. 2, 1983

[54] APPARATUS FOR MOUNTING A FORKLIFT VEHICLE ON A CARRIER VEHICLE

[75] Inventors: Gerardus J. Brouwer, Keswick; William T. Arnold, Sutton West, both of Canada

[73] Assignee: Brouwer Turf Equipment Limited, Keswick, Canada

[21] Appl. No.: 296,770

[22] Filed: Aug. 27, 1981

[51] Int. Cl.³ .............................................. B60P 3/07
[52] U.S. Cl. ...................................... 414/467; 410/3; 410/30
[58] Field of Search ...................... 414/462, 467, 498; 410/2-4, 19, 30, 66, 67

[56] References Cited

U.S. PATENT DOCUMENTS

| 3,785,517 | 1/1974 | Brajkovich | 414/462 |
| 3,799,379 | 3/1974 | Grether et al. | 414/462 X |
| 3,963,129 | 6/1976 | Clayton | 414/462 X |

Primary Examiner—Robert G. Sheridan
Attorney, Agent, or Firm—Rogers, Bereskin & Parr

[57] ABSTRACT

A forklift vehicle is mounted on the rear of a carrier vehicle with the front pneumatic tires of the forklift vehicle received in wheel pockets on the carrier vehicle, and with telescopic links suspending the rear of the forklift vehicle from the rear of the carrier vehicle. The pneumatic tires of the forklift vehicle act as a prime shock absorbing device, absorbing much of the vibration during road travel, thus reducing damage to the forklift vehicle.

13 Claims, 10 Drawing Figures

APPARATUS FOR MOUNTING A FORKLIFT VEHICLE ON A CARRIER VEHICLE

This invention relates to apparatus for mounting a forklift vehicle on a carrier vehicle.

Forklift vehicles are commonly used for loading carrier vehicles such as tractor trailers with pallets containing sod, bricks, lumber, pipes and other goods. After the tractor trailer transports its load to a place of use, a forklift vehicle is also needed to remove the pallets from the tractor trailer and to carry them to a required location. Because it would be uneconomic to keep a forklift vehicle at all of the places where it might be used, it is necessary that the forklift vehicle be transportable on the back of the carrier vehicle.

Because of this need, various systems have been developed for mounting forklift vehicles on carrier vehicles. A typical such system is that shown in U.S. Pat. No. 3,799,399 to T. H. Grether. In this system the forks of the forklift vehicle are simply inserted into pockets on the rear of the carrier vehicle, to support the weight of the forklift vehicle, and then the forklift vehicle is chained to the carrier vehicle so that the forks cannot come out of the pockets. A disadvantage of this and other prior art arrangements is that as the rear of the carrier vehicle bounces, the forklift vehicle is subject to considerable vibration. When the carrier vehicle is a long trailer with the forklift vehicle mounted on the extreme rear end thereof, the vibration can be very destructive to the forklift vehicle.

Accordingly, it is an object of the present invention to provide a simple means for mounting a forklift vehicle on a carrier vehicle, the forklift vehicle being of the kind having resilient front wheels, in which the vibration is cushioned using the resilience of the front wheels themselves. To this end the invention provides in one of its aspects attachment means for removably mounting on the rear end of a carrier vehicle, a forklift vehicle of the kind having a frame and a pair of resilient front wheels mounted on said frame, said attachment means comprising:

(a) a pair of wheel pockets, one mounted at each side of the carrier vehicle, each wheel pocket being shaped to receive and support a said front wheel and to limit upward, downward and forward movement of such front wheel, (b) and a pair of links, each link being adapted to be pivotally connected at a first pivotal connection to said carrier vehicle and to be pivotally connected at a second pivotal connection to said frame of said forklift vehicle with said links being spaced laterally apart, and being of a length to extend between said pivotal connections when said front wheels are received in said wheel pockets, so that as said carrier vehicle bounces during travel, said forklift vehicle may pivot about said first and second pivotal connections, the resilience of said front wheels acting to cushion said pivoting of said forklift vehicle.

Further objects and advantages of the invention will appear from the following description, taken together with the accompanying drawings in which.

Figure 1:
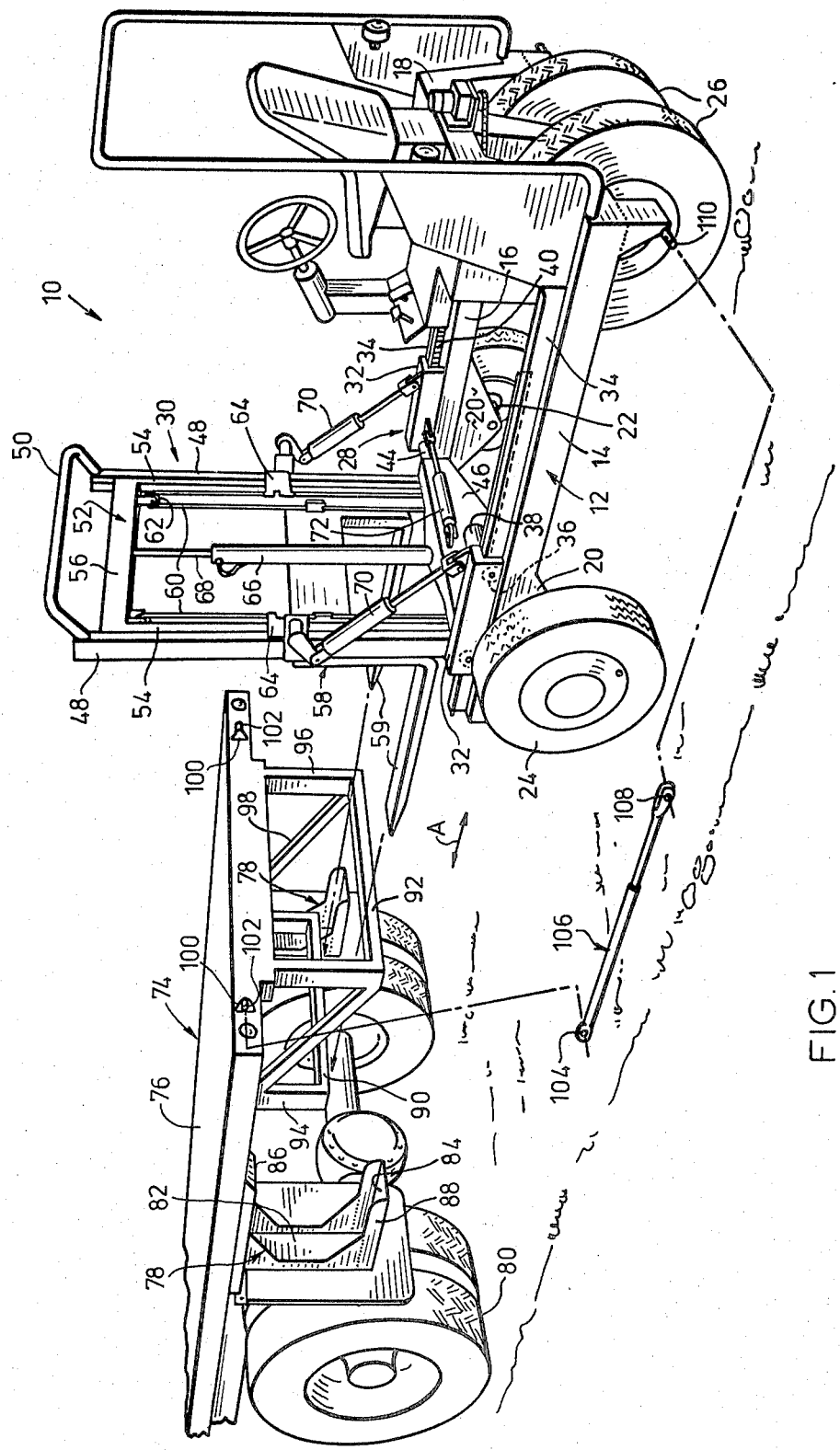
FIG. 1 is a perspective view showing a forklift vehicle in position to be moved into mounting engagement with a carrier vehicle and showing attachment means according to the invention.

Reference is first made to FIG. 1, which shows a forklift vehicle 10 of the kind shown in our co-pending patent application Ser. No. 330,327. The forklift vehicle 10 has a frame 12 formed by a pair of elongated, parallel, laterally spaced longitudinal frame members 14, 16 and a transverse rear frame member 18 which connects the rear ends of the frame members 14, 16. Each frame member 14, 16 has near its front an integral, triangular downwardly extending plate 20. Axles 22 are mounted on and project outwardly from the bottoms of plates 20 and carry front wheels 24. The front wheels 24 are pneumatic inflatable tires of substantial diameter, to facilitate travel over rough terrain along a forward and rearward path of travel as indicated by arrow A.

The rear of the vehicle 10 is supported by a pair of rear wheels 26 which are centered under the rear transverse frame member 18. The rear wheels 26 serve to drive and steer the vehicle.

Mounted on the frame members 14, 16 is a fork carriage 28 which carries a fork tower 30. The fork carriage 28 includes a pair of carriage side members 32 which are movable forwardly and rearwardly along rails 34 located atop the frame members. The carriage side members 32 are supported by rollers 36 and are driven by a hydraulic motor 38 which drives a pinion (not shown) which engages rack teeth 40 located on the underside of rails 34.

A transverse tube 44 extends between and is welded to the carriage side members 32. The base 46 of fork tower 30 is slidably and pivotally mounted on the tube 44 by rollers not shown.

The fork tower 30 includes a pair of tower channels 48 fixed to the base 46 and connected at their tops by a U-shaped tube 50, a conventional vertically movable mast 52 formed by side channels 54 connected together by a top cross member 56 and a bottom cross member not shown, and a pair of forks 58. The forks, which have forwardly projecting tines 59, are secured to chains 60. The chains 60 pass over upper sprockets 62 and lower sprockets not shown on the mast, and the chains are secured to brackets 64 welded to the tower channels 48. The mast 52 is raised and lowered by a piston 66 and piston rod 68, and as is conventional, as the mast is raised and lowered, the forks 58 will rise and fall at twice the rate of the mast.

The entire fork tower 30 can be tilted forwardly and rearwardly by pistons 70 connected between the carriage side members 32 and the tower channels 48. In addition, as is conventional, the fork tower can be side shifted by a cylinder 72 connected between one of the carriage side members 32 and the tower base 46. In summary, the entire fork carriage 28 including the forks 58 can be moved forwardly and rearwardly along the frame of the forklift vehicle, and in addition the side to side position and tilt of the fork tower 30 and hence of the forks 58 can be adjusted.

The carrier vehicle is shown as a truck 74 (it could equally be the trailer of a tractor trailer). The truck 74 includes an upper deck 76, and a pair of wheel pockets 78 located beneath the upper deck and behind the rear wheels 80 of the truck. The wheel pockets 78 will normally be secured to the frame, not shown, of the truck since they carry considerable load.

Each wheel pocket 78 includes a front wheel engaging surface 82, a lower wheel supporting surface 84, and an upper wheel engaging surface 86. The vertical distance between the upper and lower surfaces 84, 86 of each wheel pocket 78 is made equal to the normal diameter of the front wheel 24 of the forklift vehicle plus a small clearance, so that the wheel 24 will normally be received relatively snugly within the wheel pocket. Side flanges 88 on the wheel pocket prevent sideways movement of the wheels 24 out of the wheel pockets and strengthen the wheel pockets. The side flanges 88 are spaced sufficiently far apart to allow a reasonable clearance for the front wheels 24 to enter the wheel pockets.

The carrier vehicle 74 further includes, beneath its upper deck 76, front and rear cross bars 90, 92. Rear cross bar 92 is spaced below the rear of the upper deck 76 and its upper surface is located at a height convenient for the fork tines 59 to pass immediately thereabove as the forklift vehicle is being loaded onto the carrier vehicle. The front cross bar 90 is located between the rear bar 92 and the wheel pockets 78, and its bottom surface is spaced above the top surface of the rear bar 92 by a distance slightly greater than the thickness of the fork tines 59 in a vertical direction. The bars 90, 92 are supported from the truck frame by vertical struts 94, 96 at their edges and are braced by diagonal struts 98 extending between the vertical struts. The diagonal struts 98 allow the rear bar 92 to perform double duty as a bumper for the carrier vehicle.

Secured at the rear vertical edge of the deck of the carrier vehicle are a pair of brackets 100, each containing an outwardly facing pin 102. The pins 102 are adapted to receive an eye socket 104 in one end of a suspension link 106. The other end of the suspension link 106 contains a further eye socket 108 adapted to fit over an outwardly facing pin 110 which is secured to the lower rear corner of each frame member 14, 16 of the forklift vehicle.

Figure 2:
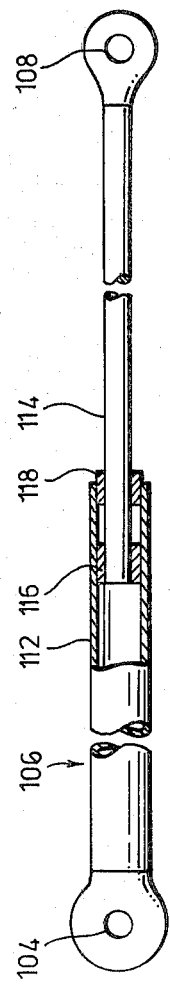
FIG. 2 is a side sectional view of a suspension link shown in FIG. 1.
Figure 4:
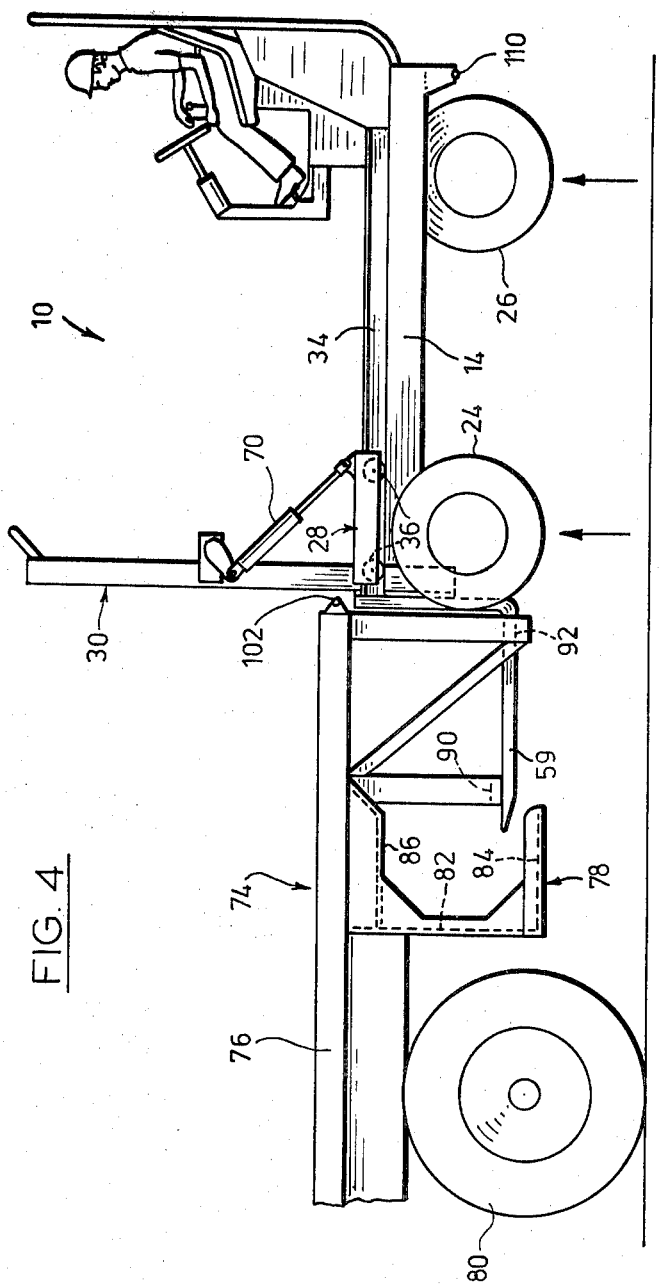
FIG. 4 is a side view similar to that of FIG. 3 showing the forklift vehicle in raised position.

As shown in FIG. 2, each suspension link 106 is formed from a tube 112 and a shaft 114 telescopically fitted together. Shaft 114 has a collar 116 welded to its outer surface at its inner end, and tube 112 has a similar collar 118 welded to its inner surface at its free end (after shaft 114 has been fitted therein). The two collars 116, 118 abut when the link 106 is extended and prevent separation or further extension of the tube 112 and shaft 114.

Figure 3:
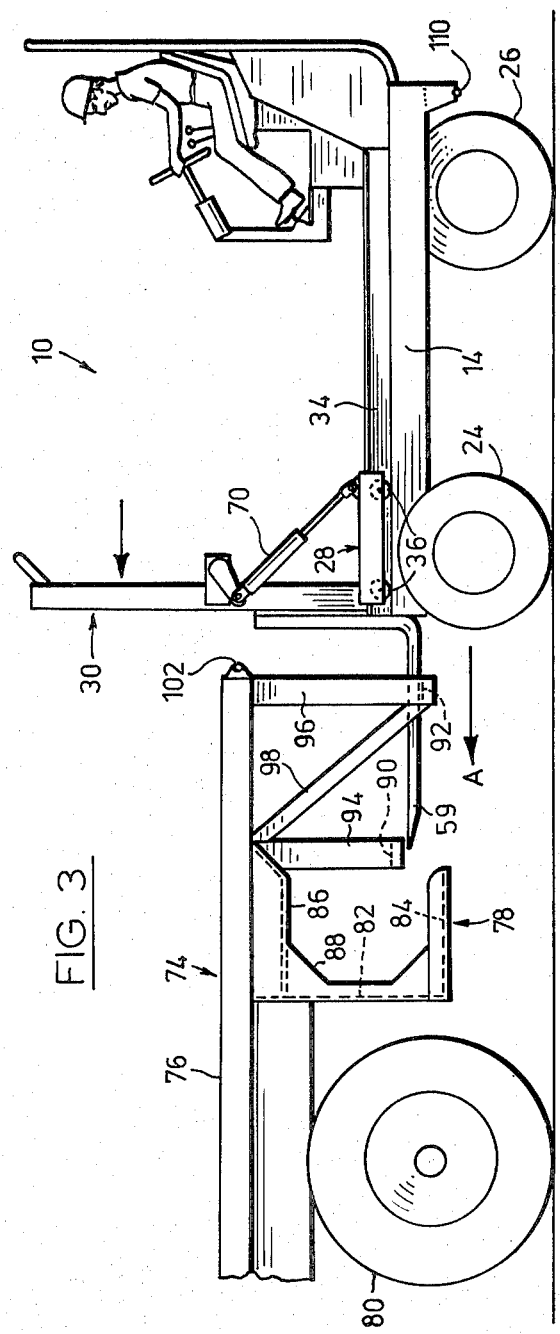
FIG. 3 is a side view of the forklift vehicle of FIG. 1 being advanced into raising position.

The manner in which the forklift vehicle is mounted on the carrier vehicle is best shown in FIGS. 3 to 6 inclusive. As shown, the forklift vehicle is first positioned so that its front wheels 24 are generally laterally aligned with wheel pockets 78. The height of the fork tines 59 is then adjusted so that they can pass over the rear cross bar 92 but beneath the front cross bar 90. The forklift vehicle is then driven forwardly as shown in FIG. 3, until the fork tines 59 are positioned with their front tips located below the front cross bar 90. The forklift vehicle is then raised, by lowering the forks, to the position shown in FIG. 4, in which the front wheels 24 are generally vertically aligned with the wheel pockets 78. At this time the weight of the forklift vehicle is supported by cross bars 90, 92.

Figure 5:
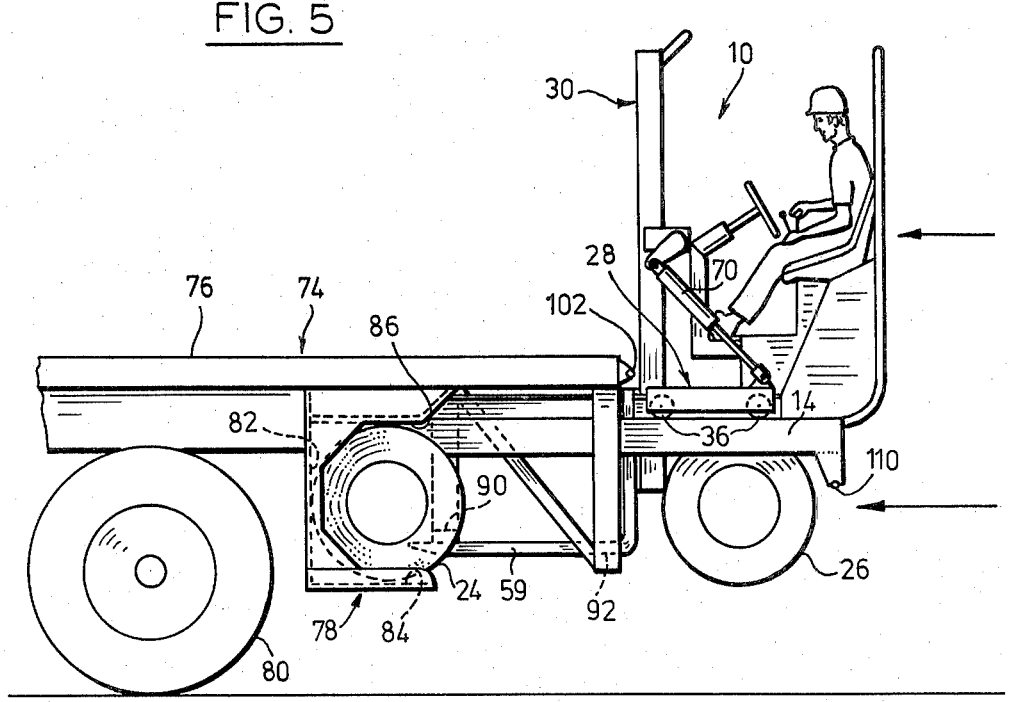
FIG. 5 is a side view similar to that of FIG. 3 showing the forklift vehicle in raised and fully advanced position.

Next, the fork carriage 28 is activated to retract the fork carriage, moving the frame 12 of the forklift vehicle forwardly and carrying the front wheels 24 into the wheel pockets 78, as shown in FIG. 5. It will be noted that if the side to side alignment of the forklift vehicle is not accurate, the forklift vehicle can be side shifted relative to the wheel pockets 78 at any time during the mounting process, by activating the side shift cylinder 72.

After the wheels 24 are firmly pressed against the fronts of the wheel sockets 78, the driver of the forklift vehicle simultaneously tilts the tower 30 rearwardly (by operating tower tilt cylinders 70) and drives the forks downwardly (by operating the piston 66). This raises the rear of the forklift vehicle frame 12, shortening the linear distance between pins 102 on the carrier vehicle and pins 110 on the forklift vehicle. (If the tower 30 were tilted rearwardly without at the same time driving the forks downwardly, the wheels 24 would tend simply to be pressed onto the bottoms of the wheel pockets 78 without raising the rear of the forklift vehicle.)

The driver now telescopes (i.e. shortens) the suspension links 106 slightly and fits them over the pins 102, 110 on the carrier and forklift vehicles. Conventional retaining pins (not shown) are then inserted through holes (not shown) in the free ends of pins 102, 110 to retain the suspension links 106 in position.

Figure 6:
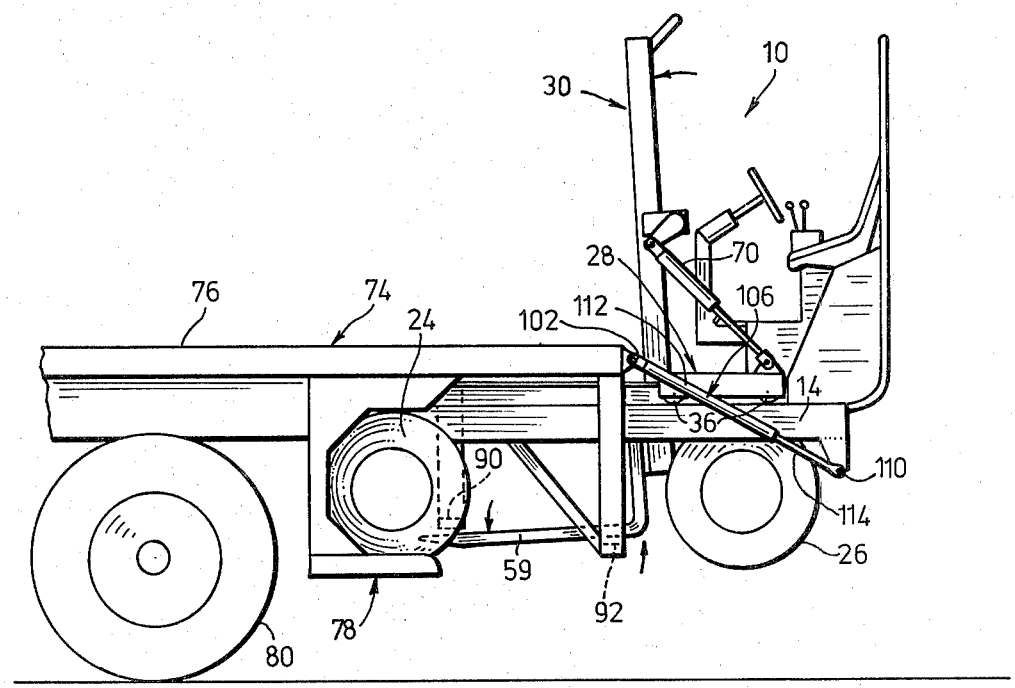
FIG. 6 is a view similar to that of FIG. 5 but showing the forks of the forklift vehicle moved out of load carrying position.

After links 106 are installed, the tower 30 is tilted forwardly and the forks 58 are raised until, as shown in FIG. 6, all weight has been removed from the fork tines 59 and the cross bars 90, 92. The forklift vehicle is now supported solely by the engagement of the front wheels 24 in the wheel pockets 78, and by the suspension links 106.

If desired, springs or shock absorbers could be placed in links 106 to cushion their telescoping action. However, tests involving driving the carrier vehicle at considerable speeds over 4 inch by 4 inch wood blocks with the forklift vehicle mounted on the carrier vehicle, have shown that the links 106 do not tend to telescope during road travel. Instead, the front wheels 24 act as air cushions and may, in extreme conditions, actually move bodily rearwardly by up to about one inch, but no telescoping of links 106 was observed.

The links 106 could be made from very sturdy cable if desired. However, the lengths of the links 106 must be quite accurate (typically to within about one quarter inch) and will vary from one carrier vehicle to another. It is very difficult to cut cable and place a termination on it where the length of the cable must be accurately controlled, particularly when the customer is installing the equipment and lacks specialized equipment. In addition, cables can stretch. With the links 106, the customer is given tube 112, and is also given shaft 114 with collar 116 welded thereto and collar 118 loose thereon. He simply sets the tube 112 and shaft 114 to the desired maximum length (which is determined by mounting the wheel pockets 78 and cross bars 90, 92 on the carrier vehicle and placing the forklift vehicle on the carrier vehicle), then cuts tube 112 to the desired length, and then welds collar 118 to tube 112. The links 106 cannot stretch and thereby cause misalignment of the forklift vehicle on the carrier vehicle.

It will be seen that the arrangement described is extremely simple, in that it requires little mechanical structure on the carrier vehicle; the structure used is extremely sturdy, and the operations required to load and unload the forklift vehicle are simple and can be performed quickly. In addition, the only springs employed are the resilient front tires of the forklift vehicle itself, which act as air cushions or springs; there are no other springs to stretch or become damaged.

It will be appreciated that the links 106 need not be telescopic but can simply be made each as a single rigid bar. However, the telescopic feature facilitates mounting the forklift vehicle on the carrier vehicle.

It will also be appreciated that the clearance between the upper wheel engaging surface 86 of each wheel pocket and the top of the front wheel therein can be relatively substantial, e.g. about 5 inches, if desired. Tests show that the tendancy of the front wheels to move upwardly during transport of the forklift vehicle is somewhat limited. However, a smaller clearance, e.g. about 2 inches, is preferred.

Figure 7:
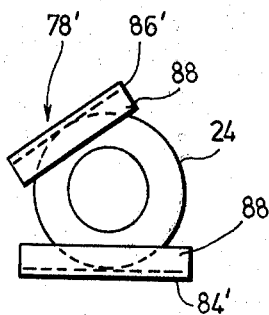
FIGS. 7, 8, 9 and 10 each show modified wheel pockets according to the invention.

The wheel pockets 78 shown are made simply from flat metal plates and are therefore inexpensive and simple to construct. However if desired, other forms of wheel pockets can be used to receive and support the front wheels of the forklift vehicle to limit upward, downward and frontward movement thereof. For example, FIG. 7 shows a wheel pocket 78' having a flat bottom plate 84' and a forwardly and downwardly sloping flat upper plate 86' which combines the functions of the front plate 82 and upper plate 86. The side flanges 88 are still present. One advantage of the wheel pocket 78' is that it will accommodate front wheels of different sizes (but the links 106 will be dimensioned to ensure that the front wheels are located at the fronts of the wheel pockets).

Figure 8:
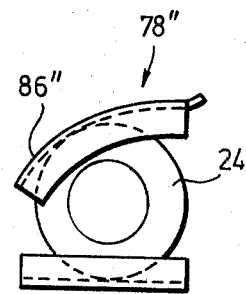
Figure 9:
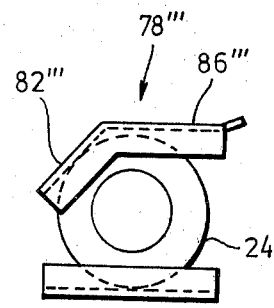
Figure 10:
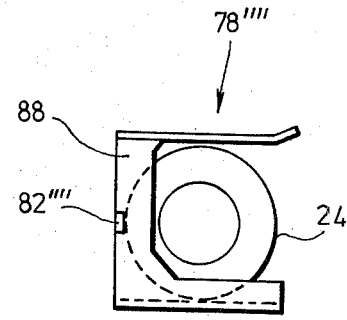

If desired, the upper plate can be curved, as shown at 86'' for wheel pocket 78'' in FIG. 8. This reduces the height needed for the wheel pocket, and provides a better stop against the upper surface of the front wheel. Alternatively, and as shown in FIG. 9, the front plate 82''' can slope forwardly and downwardly from the top plate 86'''. As another alternative, a single front crossbar 82'''' can be used, as shown in FIG. 10, extending between the flanges 88 to block forward movement of the front wheel.

In addition, the crossbars 90, 92 which are used to support the forks while the forklift vehicle is being raised into position, can if desired be replaced by a pair of sleeves or pockets (not shown) into which the forks will extend. There should be sufficient clearance for the forks in such sleeves or pockets that the weight of the forklift vehicle can be removed from the forks, as shown in FIG. 6, so that bouncing of the forklift vehicle is still absorbed by the front wheels.

We claim:

1. Attachment means for removably mounting on the rear end of a carrier vehicle, a forklift vehicle of the kind having a frame and a pair of resilient front wheels mounted on said frame, said attachment means comprising:
   (a) a pair of wheel pockets, one mounted at each side of said carrier vehicle, each wheel pocket being shaped to receive and support a said front wheel and to limit downward, upward and forward movement of such front wheel,
   (b) and a pair of links, each link being adapted to be pivotally connected at a first pivotal connection to said carrier vehicle and to be pivotally connected at a second pivotal connection to said frame of said forklift vehicle with said links being spaced laterally apart, and being of a length to extend between said pivotal connections when said front wheels are received in said wheel pockets, so that as said carrier vehicle bounces during travel, said forklift vehicle may pivot about said first and second pivotal connections, the resilience of said front wheels acting to cushion said pivoting of said forklift vehicle.

2. Attachments means according to claim 1 wherein each wheel pocket includes a bottom surface for supporting a said front wheel, and at least one further surface for limiting forward movement and upward movement of said wheel.

3. Attachment means according to claim 1 wherein each said link comprises first and second rigid members telescopically fitted together, said rigid members carrying cooperating stop means for limiting the extension of said link.

4. Attachment means according to claim 1 wherein said first pivotal connection comprises a socket on said link and a post mounted on said carrier vehicle and adapted to enter said socket.

5. Attachment means according to claim 2 wherein said carrier vehicle includes a first transverse bar mounted adjacent the rear thereof behind said wheel pockets, and a second transverse bar mounted forwardly of said first transverse bar between said wheel pockets and said first bar, both said bars being spaced below the top of said carrier vehicle, the top of said first bar being spaced below the bottom of said second bar by a distance substantially equal to the vertical thickness of the fork tines of said forklift vehicle.

6. In combination,
   (1) a forklift vehicle having:
      (a) forks having a pair of tines facing forwardly for supporting a pallet,
      (b) a frame
      (c) a fork carriage,
      (d) means mounting said fork carriage on said frame for movement forwardly and rearwardly between an extended outer position and a retracted inner position,
      (e) means mounting said forks on said fork carriage and for raising and lowering said forks,
      (f) a pair of resilient front wheels, one mounted on each side of said frame at the front thereof,
   (2) a carrier vehicle having a pair of wheel pockets, one mounted at each side of said carrier vehicle, each wheel pocket being shaped to receive and support a said front wheel of said forklift vehicle and to limit downward, upward and frontward movement of such front wheel,
   (3) a pair of links each having a first end and a second end,
   (4) a first pair of pivotal connection means for pivotally connecting said first ends of said links to said carrier vehicle at the rear of said carrier vehicle, and a pair of second pivotal connection means for pivotally connecting said second ends of said links to said frame of said forklift vehicle at the rear of said forklift vehicle with said links being spaced laterally apart, one at each side of said forklift vehicle.

so that as said carrier vehicle bounces during travel, said forklift vehicle may pivot about said first and second pivotal connection means, the resilience of said wheel acting to cushion said pivoting of said forklift vehicle.

7. Attachment means according to claim 6 wherein each wheel pocket includes a bottom surface for supporting a said front wheel, and at least one further surface for limiting forward movement and upward movement of said wheel.

8. Apparatus according to claim 7 wherein each link comprises a rigid metal bar.

9. Apparatus according to claim 7 wherein each said link comprises first and second rigid members telescopically fitted together, said rigid members carrying cooperating stop means for limiting the extension of said link.

10. Apparatus according to claim 7 wherein said carrier vehicle includes a first transverse bar mounted adjacent the rear thereof behind said wheel pockets, and a second transverse bar mounted forwardly of said first transverse bar between said wheel pockets and said first bar, both transverse bars being spaced below the top of said carrier vehicle with the top of said first transverse bar being spaced below the bottom of said second transverse bar by a distance substantially equal to the vertical thickness of said tines, whereby when said forklift vehicle is loaded onto said carrier vehicle, said forks may be inserted above said first transverse bar and below said second transverse bar, and said forks may then be lowered to raise said forklift vehicle, said fork carriage then being moved to move said frame and hence said front wheels of said forklift vehicle forwardly into said wheel holders.

11. Apparatus according to claim 10 wherein said forklift vehicle includes means for tilting said forks relative to said fork carriage, to disengage said forks from said transverse bars after said front wheels have been placed in said wheel pockets and said links have been connected between said carrier vehicle and said forklift vehicle.

12. Apparatus according to claim 6 wherein said second pivotal connection means are located at the rear of said forklift vehicle adjacent the bottom of said frame thereof, said first pivotal connection means being located above said second pivotal connection means.

13. Apparatus according to claim 6 wherein said front wheels comprise pneumatic tires.

* * * * *